(12) United States Patent
Xu et al.

(10) Patent No.: US 11,804,798 B2
(45) Date of Patent: Oct. 31, 2023

(54) DC BRUSHLESS MOTOR CONTROLLER COMPRISING LIGHTNING PROTECTION AND SURGE PROTECTION CIRCUIT

(71) Applicant: Zhongshan Broad-Ocean Motor Co., Ltd., Zhongshan (CN)

(72) Inventors: Xiaosan Xu, Zhongshan (CN); Yunsheng Chen, Zhongshan (CN); Pengyuan Chen, Zhongshan (CN); Hairong Sun, Zhongshan (CN)

(73) Assignee: ZHONGSHAN BROAD-OCEAN MOTOR CO., LTD., Zhongshan (CN)

( * ) Notice: Subject to any disclaimer, the term of this patent is extended or adjusted under 35 U.S.C. 154(b) by 0 days.

(21) Appl. No.: 17/962,436

(22) Filed: Oct. 7, 2022

(65) Prior Publication Data

US 2023/0030515 A1 Feb. 2, 2023

Related U.S. Application Data

(63) Continuation-in-part of application No. PCT/CN2021/115562, filed on Aug. 31, 2021.

(30) Foreign Application Priority Data

Apr. 15, 2021 (CN) .......................... 202120769580.6

(51) Int. Cl.
*G05B 19/042* (2006.01)
*H02P 29/024* (2016.01)

(52) U.S. Cl.
CPC ...... *H02P 29/0241* (2016.02); *H02P 2207/05* (2013.01)

(58) Field of Classification Search
CPC .. H02P 29/0241; H02P 2207/05; B24B 47/12; G05B 19/0428
See application file for complete search history.

(56) References Cited

U.S. PATENT DOCUMENTS

2019/0358769 A1* 11/2019 Miyazawa .............. B24B 47/12

FOREIGN PATENT DOCUMENTS

| CN | 1377114 A | 10/2002 | |
|---|---|---|---|
| CN | 102412573 A | 4/2012 | |
| CN | 212162801 U | 12/2020 | |
| JP | S5773 A | 1/1982 | |
| WO | WO-2020165399 A1 * | 8/2020 | ......... G05B 19/0428 |

* cited by examiner

*Primary Examiner* — Cortez M Cook
(74) *Attorney, Agent, or Firm* — MATTHIAS SCHOLL P.C.; Matthias Scholl

(57) ABSTRACT

A motor controller includes a rectifier module, an inverter circuit, an energy storage capacitor C1, a DC inductor L1, a microprocessor, and a lightning protection and surge protection circuit. The rectifier module includes an output end connected to the energy storage capacitor C1 to charge the energy storage capacitor C1; two ends of the energy storage capacitor C1 are connected to the inverter circuit to supply power to the energy storage capacitor C1. The DC inductor L1 is in series connection between a positive output end A of the rectifier module and a positive end B of the energy storage capacitor C1. The lightning protection and surge protection circuit is disposed between the rectifier module and the energy storage capacitor C1. The lightning protection and surge protection circuit includes a differential mode protection circuit and a primary common mode protection circuit.

20 Claims, 1 Drawing Sheet

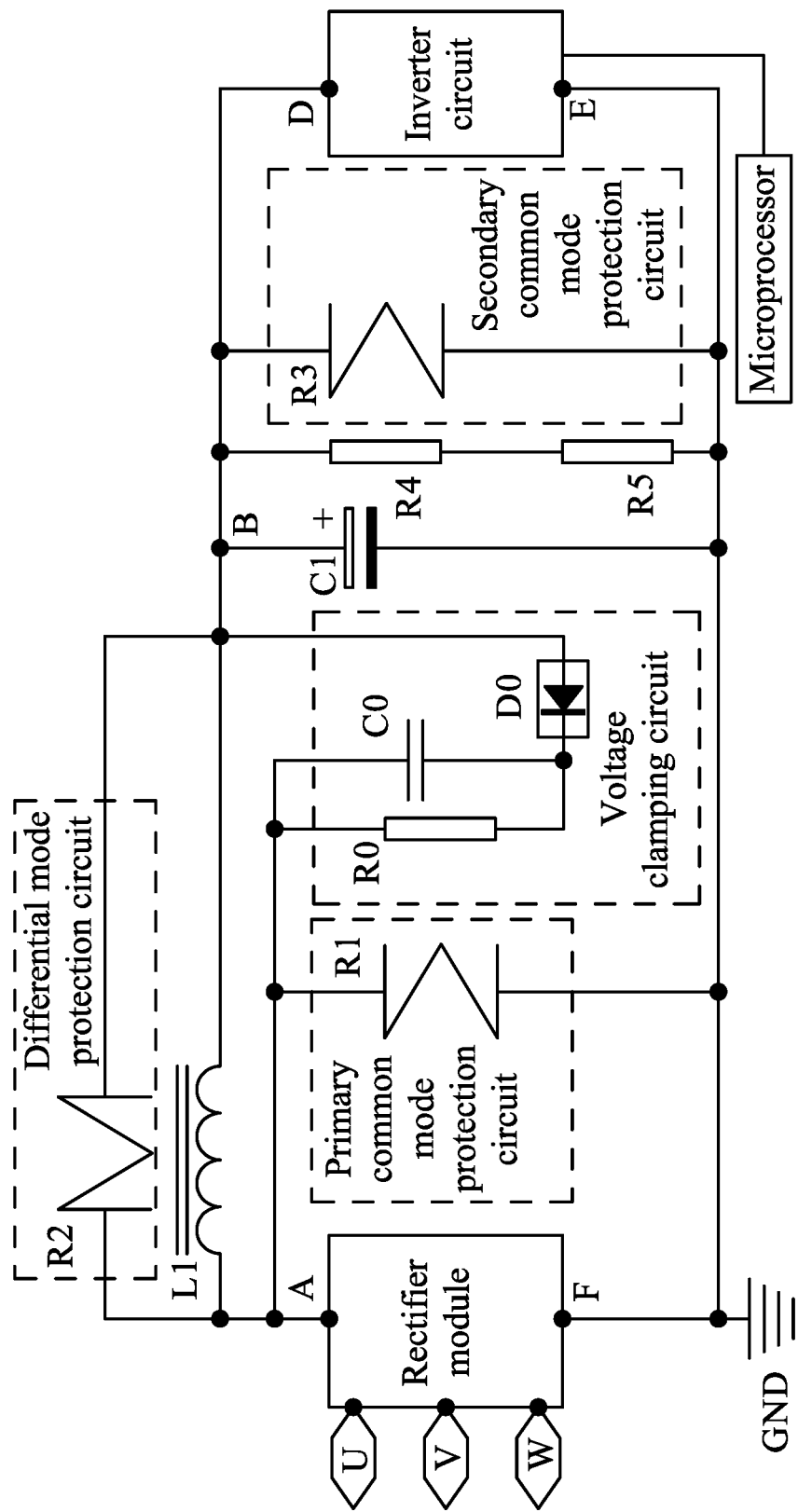

DC BRUSHLESS MOTOR CONTROLLER COMPRISING LIGHTNING PROTECTION AND SURGE PROTECTION CIRCUIT

CROSS-REFERENCE TO RELAYED APPLICATIONS

This application is a continuation-in-part of International Patent Application No. PCT/CN2021/115562 with an international filing date of Aug. 31, 2021, designating the United States, now pending, and further claims foreign priority benefits to Chinese Patent Application No. 202120769580.6 filed Apr. 15, 2021. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, MA 02142.

BACKGROUND

The disclosure relates to a DC brushless motor controller comprising a lightning protection and surge protection circuit.

In the rectifier module-inverter circuit of the variable frequency controller of a three-phase motor, a DC inductor is introduced as an energy storage element to be charged and discharged in the circuit. The discharge process of the DC inductor has impact effect on the entire control circuit, for example, the rectifier module is impacted by high voltage and is easily damaged, leading to damage and failure of controller components, and reducing the stability and reliability of the controller.

SUMMARY

The disclosure provides a DC brushless motor controller comprising a lightning protection and surge protection circuit. The motor controller comprises a rectifier module, an inverter circuit, an energy storage capacitor C1, a DC inductor L1, a microprocessor, and a lightning protection and surge protection circuit. The rectifier module comprises an output end connected to the energy storage capacitor C1 to charge the energy storage capacitor C1; two ends of the energy storage capacitor C1 are connected to the inverter circuit to supply power to the energy storage capacitor C1; the DC inductor L1 is in series connection between a positive output end A of the rectifier module and a positive end B of the energy storage capacitor C1; the lightning protection and surge protection circuit is disposed between the rectifier module and the energy storage capacitor C1; the lightning protection and surge protection circuit comprises a differential mode protection circuit and a primary common mode protection circuit; the differential mode protection circuit is in parallel connection to the DC inductor L1; and the rectifier module further comprises a negative output end F, and the primary common mode protection circuit is disposed between the positive output end A and the negative output end F of the rectifier module.

In a class of this embodiment, the differential mode protection circuit comprises a voltage-dependent resistor R2.

In a class of this embodiment, the primary common mode protection circuit comprises a voltage-dependent resistor R1.

In a class of this embodiment, a voltage clamping circuit is in parallel connection to the DC inductor L1.

In a class of this embodiment, the voltage clamping circuit comprises a diode DO, a resistor R0, and a capacitor C0; a positive pole of the diode DO is connected to the positive end B of the energy storage capacitor C1; the resistor R0 is in parallel connection to the capacitor C0 to form a parallel circuit; one end of the parallel circuit is connected to a negative pole of the diode DO, and another end of the parallel circuit is connected to the positive output end A of the rectifier module.

In a class of this embodiment, the inverter circuit comprises two input ends D, E, and a secondary common mode protection circuit is disposed between the two input ends D, E.

In a class of this embodiment, the secondary common mode protection circuit comprises a voltage-dependent resistor R3.

In a class of this embodiment, a first discharge resistor R4 and a second discharge resistor R5 are connected to two ends of the energy storage capacitor C1, respectively; and the first discharge resistor R4 and the second discharge resistor R5 are connected in series to each other.

In a class of this embodiment, the rectifier module is a three-phase rectifier module, and an input end of the rectifier module is connected to a three-phase AC input.

The following advantages are associated with the motor controller of the disclosure:

The motor controller of the disclosure comprises a rectifier module, an inverter circuit, an energy storage capacitor C1, a DC inductor L1, a microprocessor, and a lightning protection and surge protection circuit. The rectifier module comprises an output end connected to the energy storage capacitor C1 to charge the energy storage capacitor C1; two ends of the energy storage capacitor C1 are connected to the inverter circuit to supply power to the energy storage capacitor C1; the DC inductor L1 is in series connection between a positive output end A of the rectifier module and a positive end B of the energy storage capacitor C1; the lightning protection and surge protection circuit is disposed between the rectifier module and the energy storage capacitor C1; the lightning protection and surge protection circuit comprises a differential mode protection circuit and a primary common mode protection circuit; the differential mode protection circuit is in parallel connection to the DC inductor L1; and the rectifier module further comprises a negative output end F, and the primary common mode protection circuit is disposed between the positive output end A and the negative output end F of the rectifier module. The discharge process of the DC inductor L1 has impact on the whole control circuit. The differential mode protection circuit and the primary common mode protection circuit can effectively prevent overvoltage damage of the rectifier module caused by high voltage impact, protect the motor controller elements from damage, and improve the stability and reliability of the motor controller.

BRIEF DESCRIPTION OF THE DRAWINGS

The invention is described hereinbelow with reference to accompanying drawings, in which the sole figure is a schematic diagram of a DC brushless motor controller comprising a lightning protection and surge protection circuit according to one embodiment of the disclosure.

DETAILED DESCRIPTION

To further illustrate the invention, experiments detailing a DC brushless motor controller comprising a lightning protection and surge protection circuit are described below. It should be noted that the following examples are intended to describe and not to limit the invention.

As shown in the sole figure, the disclosure provides a DC brushless motor controller comprising a lightning protection and surge protection circuit. The motor controller comprises a rectifier module, an inverter circuit, an energy storage capacitor C1, a DC inductor L1, a microprocessor, and a lightning protection and surge protection circuit. The rectifier module comprises an output end connected to the energy storage capacitor C1 to charge the energy storage capacitor C1; two ends of the energy storage capacitor C1 are connected to the inverter circuit to supply power to the energy storage capacitor C1; the DC inductor L1 is in series connection between a positive output end A of the rectifier module and a positive end B of the energy storage capacitor C1 to solve the current unbalance and power factor of the motor controller; the lightning protection and surge protection circuit is disposed between the rectifier module and the energy storage capacitor C1; the lightning protection and surge protection circuit comprises a differential mode protection circuit and a primary common mode protection circuit; the differential mode protection circuit is in parallel connection to the DC inductor L1; and the rectifier module further comprises a negative output end F, and the primary common mode protection circuit is disposed between the positive output end A and the negative output end F of the rectifier module. The discharge process of the DC inductor L1 has impact on the whole control circuit. The differential mode protection circuit and the primary common mode protection circuit can effectively prevent overvoltage damage of the rectifier module caused by high voltage impact, protect the motor controller elements from damage, and improve the stability and reliability of the motor controller.

The differential mode protection circuit comprises a voltage-dependent resistor R2. In a 6 kV surge immunity test of the motor controller, the design can effectively protect the rectifier module and improve the product reliability.

The primary common mode protection circuit comprises a voltage-dependent resistor R1. In a 6 kV surge immunity test of the motor controller, the design can effectively protect the rectifier module and improve the product reliability.

A voltage clamping circuit is in parallel connection to the DC inductor L1. The voltage clamping circuit absorbs the peak high voltage formed by the DC inductor L1 and protects the rectifier module.

The voltage clamping circuit comprises a diode D0, a resistor R0, and a capacitor C0; a positive pole of the diode D0 is connected to the positive end B of the energy storage capacitor C1; the resistor R0 is in parallel connection to the capacitor C0 to form a parallel circuit; one end of the parallel circuit is connected to a negative pole of the diode D0, and another end of the parallel circuit is connected to the positive output end A of the rectifier module. The voltage clamping circuit absorbs the peak high voltage formed by the DC inductor L1 to protect the rectifier module from failure. The voltage clamping circuit is adopted to reduce the withstand voltage of the rectifier module and reduce the cost of the motor controller.

The inverter circuit comprises two input ends D, E, and a secondary common mode protection circuit is disposed between the two input ends D, E. The secondary common mode protection circuit protects the inverter circuit thus avoiding the failure of its internal power devices due to high voltage breakdown.

The secondary common mode protection circuit comprises a voltage-dependent resistor R3. The voltage-dependent resistor R3 absorbs the high-frequency and peak interference voltage of the inverter circuit thus protecting the power device of the inverter circuit.

A first discharge resistor R4 and a second discharge resistor R5 are connected to two ends of the energy storage capacitor C1, respectively; and the first discharge resistor R4 and the second discharge resistor R5 are connected in series to each other.

The rectifier module is a three-phase rectifier module, and an input end of the rectifier module is connected to a three-phase AC input.

It will be obvious to those skilled in the art that changes and modifications may be made, and therefore, the aim in the appended claims is to cover all such changes and modifications.

What is claimed is:

1. A motor controller, comprising:
   1) A rectifier module;
   2) An inverter circuit;
   3) An energy storage capacitor C1;
   4) a DC inductor L1;
   5) A microprocessor; and
   6) a lightning protection and surge protection circuit;
wherein
   the rectifier module comprises an output end connected to the energy storage capacitor C1 to charge the energy storage capacitor C1;
   two ends of the energy storage capacitor C1 are connected to the inverter circuit to supply power to the energy storage capacitor C1;
   the DC inductor L1 is in series connection between a positive output end A of the rectifier module and a positive end B of the energy storage capacitor C1;
   the lightning protection and surge protection circuit is disposed between the rectifier module and the energy storage capacitor C1;
   the lightning protection and surge protection circuit comprises a differential mode protection circuit and a primary common mode protection circuit;
   the differential mode protection circuit is in a parallel connection to the DC inductor L1; and
   the rectifier module further comprises a negative output end F, and the primary common mode protection circuit is disposed between the positive output end A and the negative output end F of the rectifier module.

2. The motor controller of claim 1, wherein the differential mode protection circuit comprises a voltage-dependent resistor R2.

3. The motor controller of claim 2, wherein the primary common mode protection circuit comprises a voltage-dependent resistor R1.

4. The motor controller of claim 1, wherein a voltage clamping circuit is in parallel connection to the DC inductor L1.

5. The motor controller of claim 2, wherein a voltage clamping circuit is in parallel connection to the DC inductor L1.

6. The motor controller of claim 3, wherein a voltage clamping circuit is in parallel connection to the DC inductor L1.

7. The motor controller of claim 4, wherein the voltage clamping circuit comprises a diode D0, a resistor R0, and a capacitor C0; a positive pole of the diode D0 is connected to the positive end B of the energy storage capacitor C1; the resistor R0 is in parallel connection to the capacitor C0 to form a parallel circuit; one end of the parallel circuit is connected to a negative pole of the diode D0, and another end of the parallel circuit is connected to the positive output end A of the rectifier module.

8. The motor controller of claim 5, wherein the voltage clamping circuit comprises a diode D0, a resistor R0, and a capacitor C0; a positive pole of the diode D0 is connected to the positive end B of the energy storage capacitor C1; the resistor R0 is in parallel connection to the capacitor C0 to form a parallel circuit; one end of the parallel circuit is connected to a negative pole of the diode D0, and another end of the parallel circuit is connected to the positive output end A of the rectifier module.

9. The motor controller of claim 6, wherein the voltage clamping circuit comprises a diode D0, a resistor R0, and a capacitor C0; a positive pole of the diode D0 is connected to the positive end B of the energy storage capacitor C1; the resistor R0 is in parallel connection to the capacitor C0 to form a parallel circuit; one end of the parallel circuit is connected to a negative pole of the diode D0, and another end of the parallel circuit is connected to the positive output end A of the rectifier module.

10. The motor controller of claim 1, wherein the inverter circuit comprises two input ends D, E, and a secondary common mode protection circuit is disposed between the two input ends D, E.

11. The motor controller of claim 2, wherein the inverter circuit comprises two input ends D, E, and a secondary common mode protection circuit is disposed between the two input ends D, E.

12. The motor controller of claim 3, wherein the inverter circuit comprises two input ends D, E, and a secondary common mode protection circuit is disposed between the two input ends D, E.

13. The motor controller of claim 10, wherein the secondary common mode protection circuit comprises a voltage-dependent resistor R3.

14. The motor controller of claim 12, wherein the secondary common mode protection circuit comprises a voltage-dependent resistor R3.

15. The motor controller of claim 1, wherein a first discharge resistor R4 and a second discharge resistor R5 are connected to two ends of the energy storage capacitor C1, respectively; and the first discharge resistor R4 and the second discharge resistor R5 are connected in series to each other.

16. The motor controller of claim 2, wherein a first discharge resistor R4 and a second discharge resistor R5 are connected to two ends of the energy storage capacitor C1, respectively; and the first discharge resistor R4 and the second discharge resistor R5 are connected in series to each other.

17. The motor controller of claim 3, wherein a first discharge resistor R4 and a second discharge resistor R5 are connected to two ends of the energy storage capacitor C1, respectively; and the first discharge resistor R4 and the second discharge resistor R5 are connected in series to each other.

18. The motor controller of claim 1, wherein the rectifier module is a three-phase rectifier module, and an input end of the rectifier module is connected to a three-phase AC input.

19. The motor controller of claim 2, wherein the rectifier module is a three-phase rectifier module, and an input end of the rectifier module is connected to a three-phase AC input.

20. The motor controller of claim 3, wherein the rectifier module is a three-phase rectifier module, and an input end of the rectifier module is connected to a three-phase AC input.

* * * * *